Figure 1:
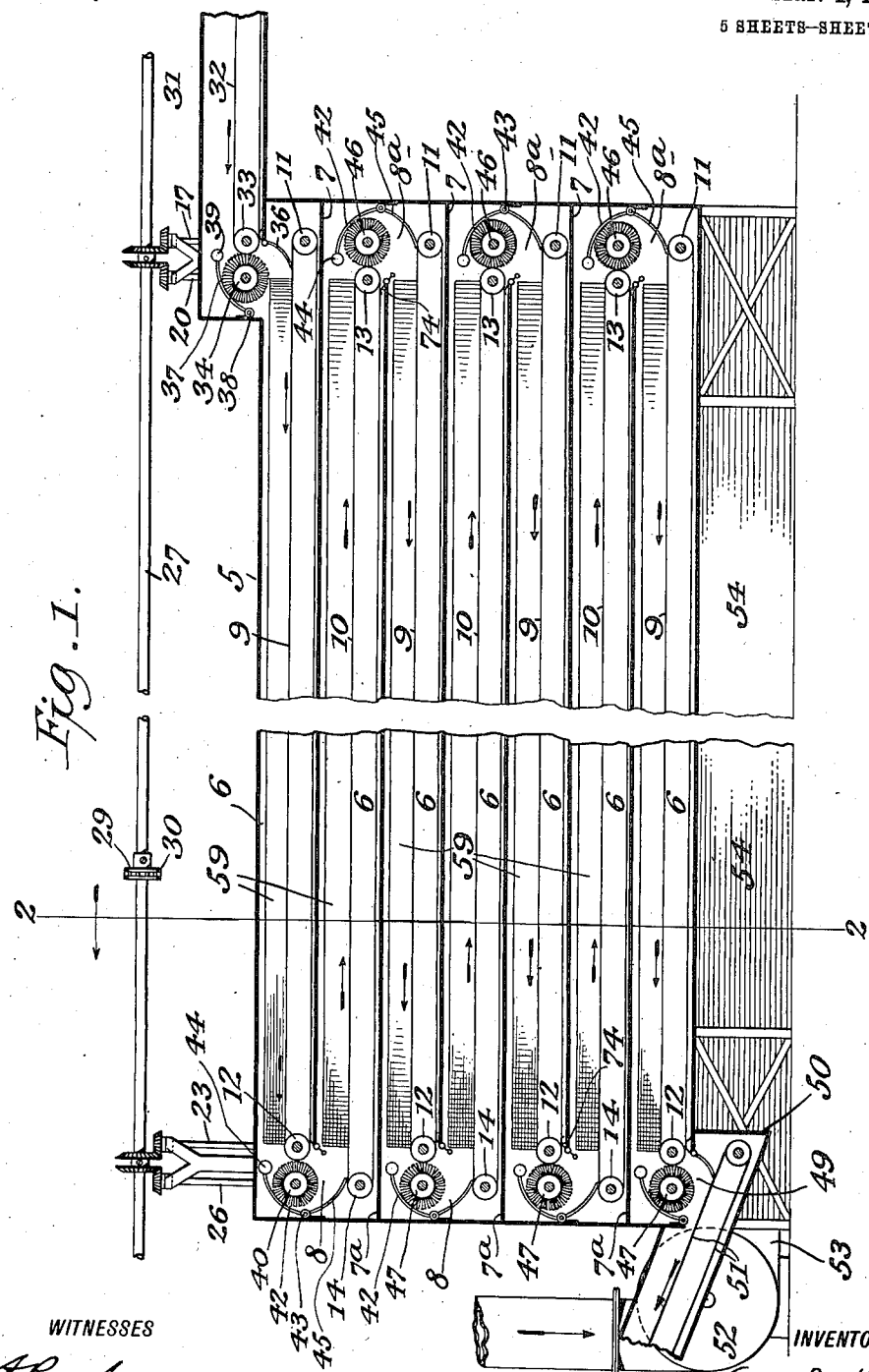

G. D. HARRIS & J. S. POLLARD.
DEHYDRATING APPARATUS.
APPLICATION FILED AUG. 4, 1911.

1,054,765.

Patented Mar. 4, 1913.

5 SHEETS—SHEET 1.

WITNESSES
A. R. Appleman
M. E. Freeman

BY

INVENTOR
Gordon Don Harris
and James S. Pollard.
Griffin & Bernhard
ATTORNEYS

G. D. HARRIS & J. S. POLLARD.
DEHYDRATING APPARATUS.
APPLICATION FILED AUG. 4, 1911.

1,054,765.

Patented Mar. 4, 1913.

5 SHEETS—SHEET 4.

WITNESSES
A. R. Appleman.
M. E. Freeman.

INVENTORS.
GORDON DON HARRIS
and JAMES S. POLLARD.
BY Griffin & Bernhard
ATTORNEYS

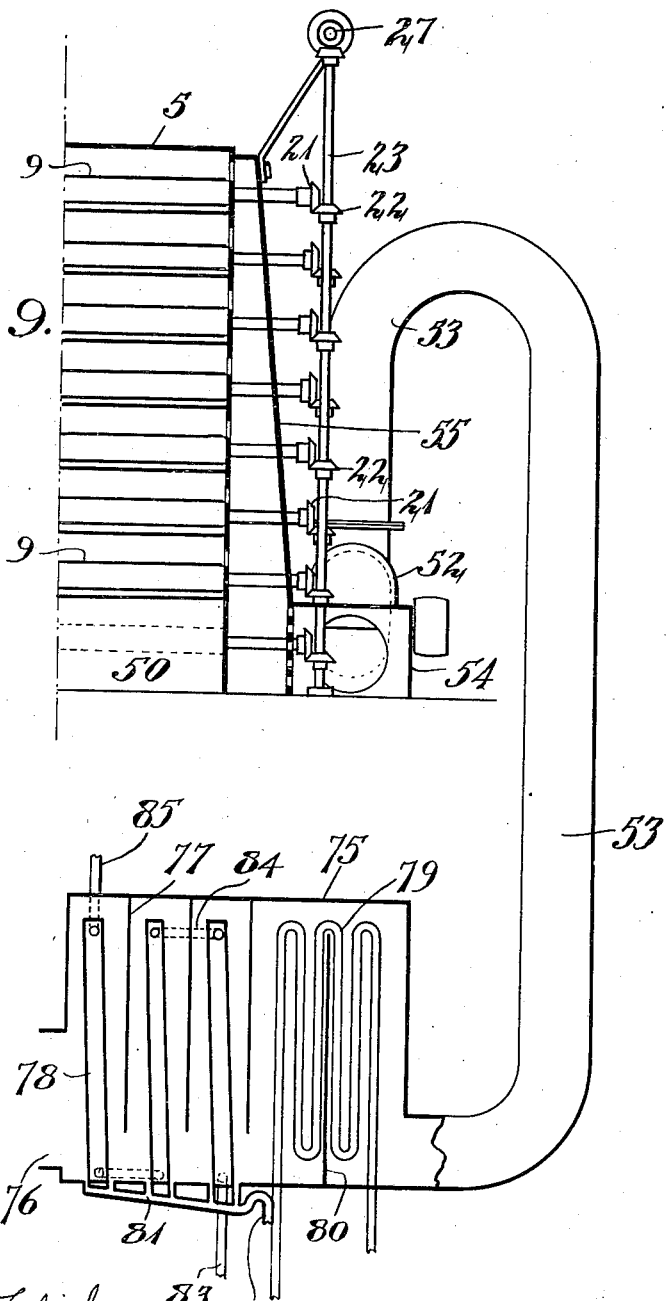

UNITED STATES PATENT OFFICE.

GORDON DON HARRIS, OF BAY SHORE, AND JAMES S. POLLARD, OF MAMARONECK, NEW YORK, ASSIGNORS TO GENERAL DEHYDRATOR COMPANY, OF NEW YORK, N. Y., A CORPORATION OF NEW YORK.

DEHYDRATING APPARATUS.

1,054,765.  Specification of Letters Patent.  Patented Mar. 4, 1913.

Application filed August 4, 1911. Serial No. 642,229.

*To all whom it may concern:*

Be it known that we, GORDON DON HARRIS, a citizen of the United States, residing at Bay Shore, Suffolk county, Long Island, and State of New York, and JAMES S. POLLARD, a citizen of the United States, residing at Mamaroneck, Westchester county, and State of New York, have jointly invented a certain new and useful Dehydrating Apparatus, of which the following is a specification.

This invention is a dehydrating apparatus for treating various substances, such as edible products, in a manner to deprive the substance of moisture without a breaking down in the cellular structure of the substance under treatment.

The apparatus is intended to continuously and economically subject to treatment a moisture containing material by bringing said material into intimate contact with warm dehydrated air, the material being carried at a certain rate of speed through the apparatus, and dehydrated air being supplied continuously to the apparatus. The air so supplied is distributed uniformly through the apparatus in a manner calculated to constantly bring fresh dry air into contact with the moving material under treatment, so that the dehydrated air will absorb and carry off the moisture emanating from the material. Provision is made for carrying off the moisture laden air uniformly and thoroughly from the apparatus, so that the material will be rapidly and economically treated, it being practically impossible for the moisture laden air to remain in contact with the desiccated or partially desiccated material so as to obviate reabsorption by the material of the moisture in the outgoing currents of air.

The invention in one form of apparatus is embodied in a chamber, of suitable dimensions, divided into a series of compartments, a traveling conveyer positioned in each compartment, brushing devices by which the material is removed from a delivery end of one conveyer and discharged upon a loading end of the next conveyer, means for feeding the material to be treated to the chamber, means for carrying off the treated material from the chamber, means for supplying dehydrated air to the chamber, and means for exhausting moisture laden air from the chamber.

Provision is made for distributing the dehydrated air, preferably warm air, uniformly through the several compartments of the chamber; for so regulating the flow of air through the compartments and endless conveyers as to bring the air into intimate contact with the material carried by the conveyers; and for so controlling the outflow of the moisture laden currents as to exhaust the compartments rapidly in order that the fresh dehydrated air will flow into and through the compartments.

A special feature of the apparatus resides in dampers positioned within the compartments in such manner as to preclude the warm moisture laden air from passing from one compartment into another compartment at or near the brushing devices and the conveyer supporting rollers.

Other features of the invention and the advantages thereof will appear in the course of the following detailed description.

In the accompanying drawings, we have illustrated one practical embodiment of the invention, but the construction shown therein is to be understood as illustrative, only, and not as defining the limits of the invention.

Figure 2:
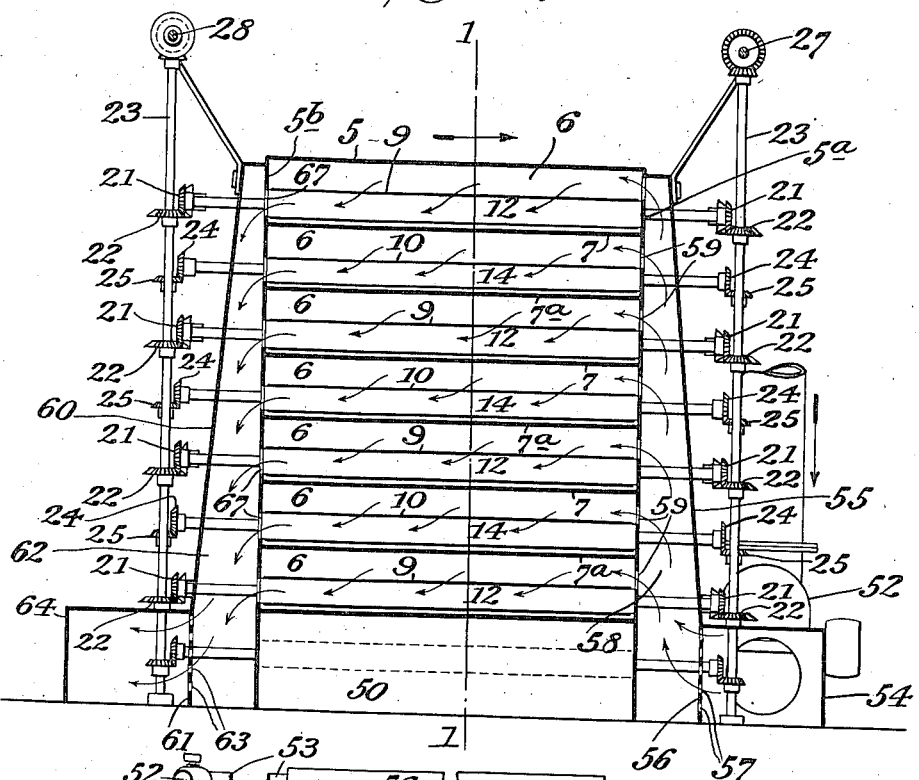
Figure 3:
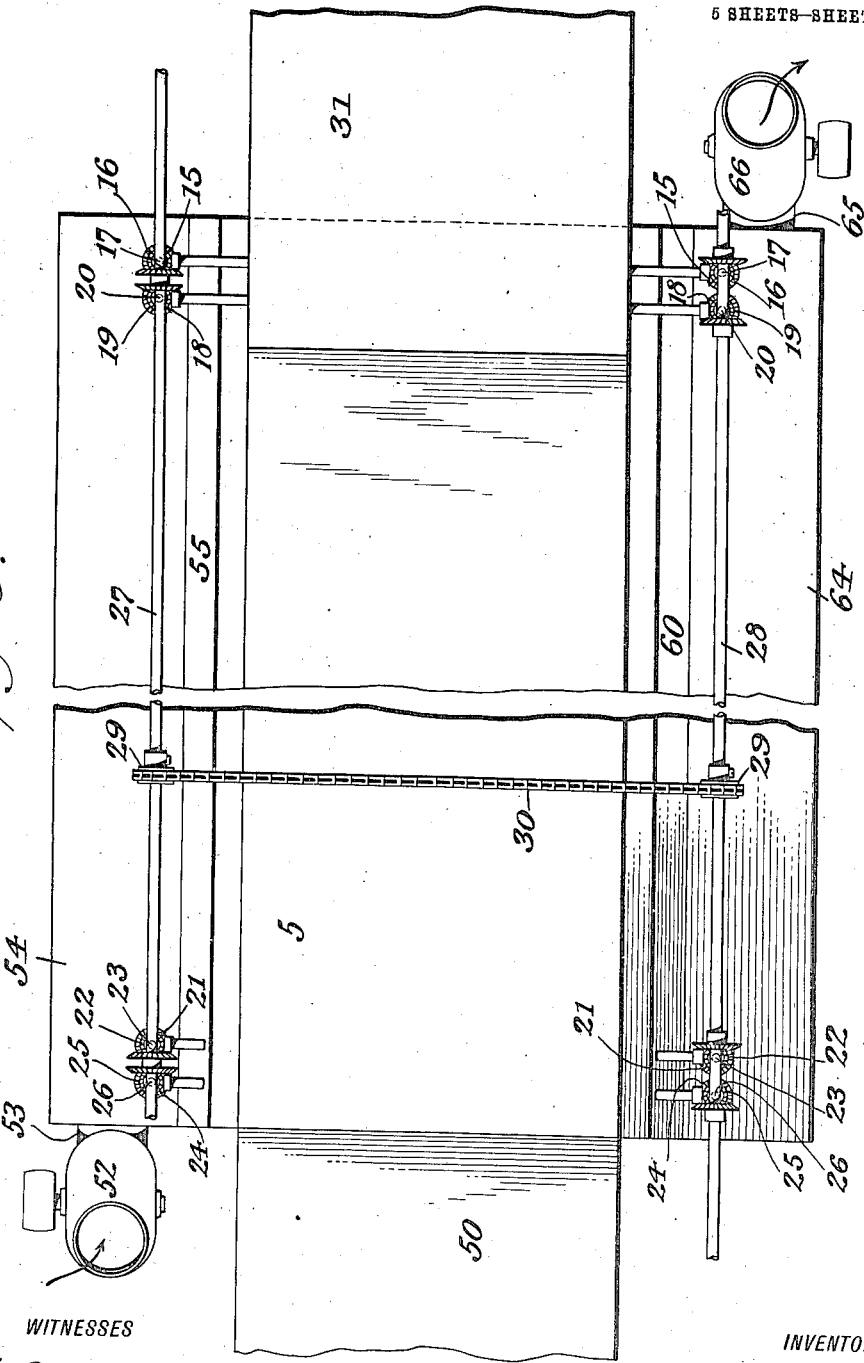
Figure 4:
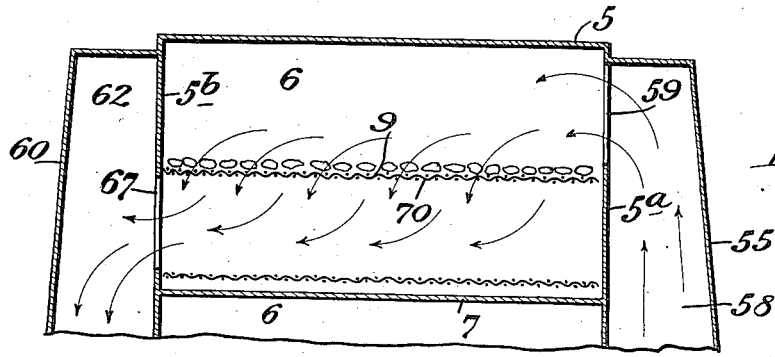
Figure 5:
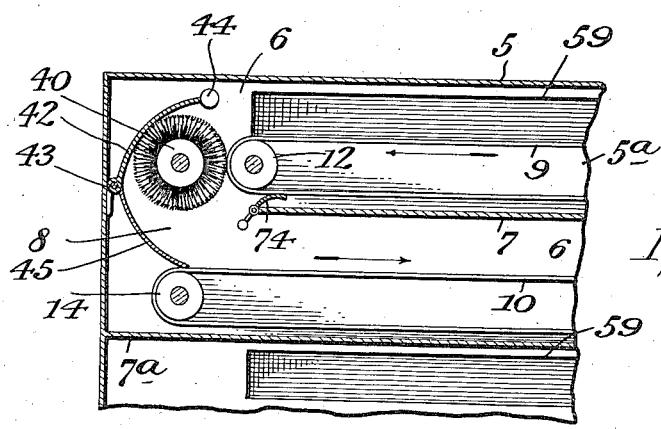
Figure 6:
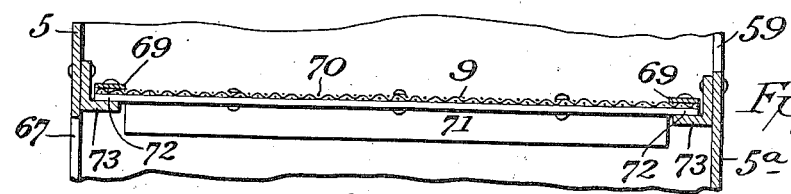
Figure 7:
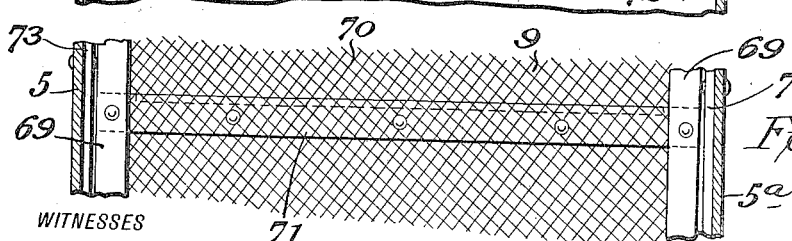

Figure 1 is a vertical longitudinal section through a dehydrating apparatus embodying our invention, the plane of the section being indicated by the dotted line 1—1 of Fig. 2. Fig. 2 is a vertical cross section on the line 2—2 of Fig. 1. Fig. 3 is a plan view. Figs. 4, 5, 6 and 7 are detail views of parts of the apparatus to be hereinafter described. Fig. 8 is a diagrammatic view showing the shafts positioned exteriorly of the flues. Fig. 9 is a diagrammatic view illustrating means for dehydrating and warming air to be supplied to the wind trunk which feeds the air into the upwardly tapering air supply flue.

In carrying out this invention we employ a casing 5 which may be of any suitable length, width and height, said casing producing a chamber within which the material is subjected to the action of dehydrated air at a suitable temperature. The interior of the chamber is divided into a number of compartments by partitions 7, 7ª. The partitions extend horizontally through the chamber of casing 5 so as to produce a series of compartments 6 positioned one above the other. Partitions 7 extend from one end wall of casing 5 nearly to the opposite end wall of the casing, but partitions 7ª extend from the other end wall of the casing nearly to the opposite end wall thereof, as clearly shown in Fig. 1. This arrangement of the partitions provides spaces 8 at one end of the compartments, and other spaces 8ª at the other end of the compartments, whereby the material is adapted to be carried in a zig zag path through the chamber of casing 5 and through successive compartments 6 of casing 5.

A series of endless conveyers 9, 10 are positioned in compartments 6, one of said conveyers being in each compartment. Each conveyer 9 is supported by two rollers 11, 12, whereas each conveyer 10 is supported by two rollers 13, 14, said rollers extending transversely through the compartments and having their shafts journaled in suitable bearings, the ends of said shafts extending beyond the compartments. The extended ends of the shafts for rollers 11 are provided with bevel gears 15 which mesh with bevel gears 16 on vertical shafts 17. The shafts of rollers 13 are provided with bevel gears 18 which mesh with other bevel gears 19 on vertical shafts 20. The shafts of rollers 12 at the opposite end of the casing are provided with bevel gears 21 which mesh with bevel gears 22 on vertical shafts 23. Similarly, the shafts of rollers 14 are provided with bevel gears 24 which mesh with bevel gears 25 on vertical shafts 26. Said vertical shafts are provided at the respective ends of the casing for the purpose of simultaneously driving all the rollers 11, 12, 13, 14 at the same speed, so that all the conveyers 9, 10 will be operated uniformly. Suitable means are provided for imparting motion to the vertical roller driving shafts, and in the drawings we have shown horizontal line shafts 27 28 positioned over the respective side portions of the casing as shown in Fig. 2, said line shafts being provided with sprockets 29 which are engaged by an endless sprocket chain 30, thus insuring the rotation of line shafts 27, 28 at uniform speed. One of the line shafts is driven by operative connections with any suitable source of power, or it may be directly operated by a motor as preferred.

Rollers 11 are positioned quite close to one end wall of the casing, whereas rollers 14 are positioned close to the opposite end wall of the casing. Rollers 12, 13 are positioned near the respective end walls of the casing, said rollers 13 being in a vertical plane within the plane of rollers 11, whereas rollers 12 are in a vertical plane at one side of the vertical plane of rollers 14. Generally speaking, rollers 12 lie above the inner ends of partitions 7, whereas rollers 13 are above the end portions of partitions 7ª, so that the four series of rollers are staggered in a way to permit the material to pass from the discharging end of one conveyer upon the loading end of the conveyer next below it, whereby the material is carried successively through compartments 6 and in a zig zag path through casing 5.

The material to be treated is supplied to the upper part of casing 5 at one end thereof. A feeding duct 31 is attached to casing 5 so as to communicate with the uppermost compartment 6 thereof. Within this feeding duct operates a feeding conveyer 32, one end of which is supported and driven by a roller 33 which is geared to one of the vertical shafts 17 so as to be operated thereby. Adjacent the delivery end of the feeding conveyer is a brushing device 34 herein shown as a rotary brush, the shaft of which is geared to the vertical shaft 20, the latter shaft being driven from one of the horizontal line shafts 27. Below the roller 33 is positioned a damper 36 which is pivoted so that its free end will normally rest upon the uppermost conveyer 9, said damper operating, also, to direct the material upon the loading end of said conveyer 9. Over the rotary brush is positioned a damper 37, the lower end of which is pivoted as at 38 to the casing. Said damper 37 hangs over and rests upon rotary brush 34 so as to have frictional contact therewith, the free end of said damper 37 being weighted as at 39. The two dampers 36, 37 are in coöperative relation to rollers 33 and brush 34, for the purpose, mainly, of precluding the passage of air from uppermost compartment 6 into feeding duct 31.

At the delivery end of the upper conveyer 9 is positioned a brushing device 40 shown as a rotary brush. Said rotary brush is positioned in the space 8 at the left hand end of upper compartment 6, and said brush is positively driven from the vertical shaft 26 through suitable gearing, whereby the brush is operated so as to have frictional contact with the delivery end of upper conveyer 9, for the purpose of precluding the material from adhering to said end of the conveyer. A damper 42 is hung or pivoted at 43 in the casing, the free upper end of said damper being weighted at 44. The damper overhangs rotary brush 40 so as to have frictional contact therewith. Another damper 45 is hung at 43 within the space 8, and this damper 45 extends downwardly and toward the conveyer 10 next below uppermost conveyer 9, said damper 45 operating to direct the material discharged from uppermost conveyer 9 to and upon the loading end of the next adjacent conveyer 10. Dampers 42, 45 coöperate with brush 40 and roller 12 in minimizing the passage of air from the second compartment 6 into the uppermost compartment 6, so that a current of moisture laden air from one compartment will not be free to pass into the next adjacent compartment, thereby making each compartment independent and also equalizing the flow of air through all the compartments, 6, to produce a greater degree of absorption, as will be hereinafter explained.

The rotary brushes 46, 47 are provided at the respective ends of the apparatus, brushes 46 being adjacent to rollers 13 of conveyers 10 and brushes 47 being adjacent the delivery ends of conveyers 9. Brushes 46 are substantially in the same vertical plane as rollers 11, so that the shafts of said brushes 46 are geared to the vertical shaft 17, whereby said shafts 17, 26 will operate to impart rotary motion to the two series of brushes. The two series of brushes are driven by their shafts 17, 26 at greater peripheral speed than the lineal speed of conveyers 9, 10, it being preferred to drive the brushes one-third faster than the speed of the conveyers, whereby the brushes operate efficiently in mechanically removing the material from the delivery ends of the conveyers.

Dampers 42, 45 are positioned in the spaces 8, 8ª at the delivery ends of conveyers 9, 10, said dampers 42 overhanging the brushes 46, 47, and the dampers 45 being positioned below said brushes 46, 47 so as to direct the material from the delivery end of one conveyer to the loading end of the conveyer next below it, the main function of dampers 42, 45 being to preclude the passage of moisture laden air from one compartment into the next compartment through spaces 8, 8ª.

The material from the lowermost conveyer 10 is discharged through an opening 49 into the boot 50 of an offbearing conveyer or elevator 51, the receiving end of said boot 50 being below roller 12 and brush 47 at the delivery end of the lowermost conveyer 10. The offbearing conveyer or elevator 51 may be of any suitable construction, and it operates to continuously carry the desiccated material away from the apparatus to a desired point where the material may be stored, packed, or subjected to other treatment.

A peculiarity of our apparatus is that dehydrated air, at a suitable temperature, is supplied continuously to the apparatus and under comparatively light pressure. The air is subjected to treatment in an apparatus of one form or another so as to deprive it of moisture, or an excess of moisture, and preferably the air is heated to a temperature suitable for treating the particular material which is adapted to be supplied continuously to the apparatus by the feeding conveyer 32. The air is blown into the apparatus by a blast fan or blower 52, positioned at any suitable distance from the apparatus, the duct 53 of said fan or blower being suitably connected with the casing of supply chamber 54. Extending lengthwise of casing 5, at one side thereof, is an upright wall 55, a part of said wall 55 being vertical as indicated at 56, said vertical part 56 of the wall being perforated at 57 and forming one wall of the chamber 54. The wall 55 above chamber 54 is inclined inwardly toward a side wall 5ª of casing 5, said side wall 5ª of casing 5 and the wall 55 producing an upwardly extending flue 58. This flue tapers upwardly, and it is supplied with dehydrated air from chamber 54. The perforations 57 in the lower vertical part 56 of inclined wall 55 reduces to some extent the blast of air flowing from chamber 54 into the lower part of upwardly tapering flue 58, and said perforations tend in a measure to equalize the flow of air from chamber 54 into the lower part of said flue 58. In the side wall 5ª of casing 5 is a series of air inlets 59, said inlets being in the form of slots or openings which extend longitudinally of casing 5.

An essential feature of our invention is the location of the inlets between flue 58 and the compartments 6 which contain the endless conveyers 9, 10. The upward taper given to flue 58 tends to equalize the distribution of air into the other compartments 6 of the casing, so that the upper tier of compartments 6 will be supplied with the same volume of dehydrated air as the lower tier of compartments which communicate with the flue.

In Fig. 9 of the drawings we have shown diagrammatically one embodiment of means for dehydrating air and for warming the air prior to the admission of such warm dehydrated air into the chamber or wind trunk 54. A duct 53 leading to the blower 52 is extended in a suitable direction, such as the downward direction shown in Fig. 9, for the purpose of connecting said duct to a casing 75. This casing is provided at its opposite end with an air inlet 76, and within the casing is positioned a series of partitions 77, a suitable number of chambered metal plates 78, a heating coil 79 and a partition 80. The chambered plates 78 and the partitions 77 alternate with each other so as to produce an irregular passage through which air will flow in upward and downward paths, and these chambered plates are adapted to be supplied with a cooling or refrigerating medium of any suitable character, whereby the surfaces of the plates are maintained at a temperature much below that of the temperature of the air admitted into the casing through inlet 76, whereby the air flowing into contact with the cold surfaces of the plates will be cooled and the moisture in the air will condense upon the surfaces of the plates. As a result of this operation the moisture is eliminated from the air and said moisture is liquefied so that it will flow or trickle down the surfaces of the plates and be discharged into a flue 81 leading to a trap 82, whereby the moisture is trapped out of the air dehydrating chamber. The cooling or refrigerating medium is supplied to one of the chambered plates by an inlet pipe 83; said chambered plates are connected by short pipes 84 in order that the cooling medium may circulate successively through the chambered plates, and the cooling medium flows out of the last chambered plate through a pipe 85, whereby pipes 83 85 establish a circulation through the chambered plates.

The heater 79 is positioned between the condensing chambered plates and the air duct 53, and with this heater coöperates the partition 80, whereby the air is directed to flow upwardly and downwardly with respect to the heater and into intimate contact with the surfaces thereof. It is manifest that the blower 52 will draw air through the heater and through the heating coils, thereby dehydrating and warming the air, said blower operating to blow the air into the wind trunk 54, from whence the air flows into the upwardly tapering flue 55.

Adjacent to the other side wall $5^b$ of casing 5 is an upright wall 60, the lower part of which is substantially vertical at 61, whereas wall 60 from the vertical part is inclined inwardly toward wall $5^b$ of said casing 5. The wall $5^b$ and inclined wall 60 produce a tapering flue 62 at the opposite side of casing 5 from the inlet flue 58. The vertical part 61 of the upright wall is perforated at 63, and this perforated part forms a wall of a suction or exhaust chamber 64, with which exhaust chamber communicates a duct 65 which leads to an exhaust fan 66 said exhaust fan being positioned at any suitable distance from the apparatus, said wall 63 assisting in equalizing the exhaust. Communication between exhaust flue 62 and the compartments 6 is established by air exits 67 which are provided in the wall $5^b$ of casing 5, each air exit 67 being positioned in a different horizontal plane from the air inlets 59, said air inlets 67 being in a plane between the leads or runs of one conveyer, as clearly shown in the drawings. It is apparent that each compartment 6 is provided at one side with an air inlet 59 positioned above the conveyer whereas said compartment is provided at its opposite side with an air exit 67, the horizontal plane of which is below the air inlet 59 and between the runs or leads of the conveyer in said compartment 6.

By reference to the drawings it will be noted that the wall $5^b$ of each compartment 6 is closed or imperforate in the horizontal plane of the air inlet 59, and that the air exit 67 in said wall $5^b$ is below the upper run of the conveyer. This relative arrangement of the air inlet and the air exit to the conveyer in each compartment is important, for the reason that the air supplied to the compartment will flow over and downwardly through the conveyer, the air admitted at inlet 59 being compelled to pass through the interstices or perforations of the conveyer before the air can make its escape through exit 67. The imperforate wall $5^b$ at the air outlet side of the compartment precludes the air from passing directly out of the compartments when circulating over the material on the conveyer, and thus the air in passing downwardly through the upper end of the conveyer is brought into intimate contact with the material which is carried by the conveyer through the compartments, whereby the efficiency and economy of the apparatus are substantially increased.

The employment of the tapering flue 62 at one side of the series of compartments has the effect of drawing off the moisture laden air uniformly from all the compartments. In practice, we prefer to drive the exhaust fan 66 at a somewhat increased speed as compared with the blast fan or blower 52, and thus there is created in flue 62 a partial vacuum which tends to rapidly displace or draw off the moisture laden air from the compartments 6. It is to be observed in this connection that the moisture laden air from compartments 6 passes into a suction flue 62 which extends downwardly from the compartments, so that the natural tendency of the moisure laden air to fall by gravity in the flue 62 is utilized to a substantial extent, whereby the moisture laden air will be thoroughly drawn off from the material treating compartments of the apparatus.

Any form of conveyer suitable for the purpose of this apparatus may be employed in our material treating compartments 6, but in the drawings we have illustrated one form of conveyer which will not sag to any substantial extent under the weight of the load which is imposed upon the upper run or lead of said conveyer.

Our conveyer consists of endless bands or tapes 69, an endless flexible web 70 composed of wire cloth or other foraminous material and a plurality of transverse slats 71. The endless bands or tapes 69 may be, and preferably are, composed of flexible metal, and they are attached to the edge portions of the endless web 70. The transverse slats 71 are positioned across the endless web and at suitable intervals intermediate the length of said web. Said transverse slats are notched or cut away at each end so as to produce the flanges 72, and with the respective side portions of the conveyer are associated weight-supporting member 73. These members are in the form of angle irons which are secured firmly to the side walls 5ª, 6ᵇ of the casing and within the compartments 6 thereof, said angle irons being so positioned that their horizontal flanges will extend below the upper run of the endless conveyer and below the flanges 72 of the reinforcing slats of said conveyer. The horizontal flanges of the angle irons are thus positioned for coöperation with the upper run or lead of the endless conveyer in a manner to support said part of the conveyer for the purpose of preventing said upper run of the conveyer from sagging under the weight of the load which is borne by the conveyer. It will be understood, however, that we do not limit the invention to any particular construction of endless conveyer.

Another important feature is the baffle 74 which extends the full width of each compartment. This baffle is hinged to the partition 7, see Fig. 5, in such a manner that the weighted end thereof depends to force the curved wall into operative position against the conveyer belt where it engages with the roller, 12 or 13, said baffle precluding the air from flowing out through opening 67 and compelling the currents of air to be conducted in predetermined paths through the apparatus, thereby preventing lost effort in the next succeeding chambers.

In Fig. 8 we have shown a diagrammatic view, which is similar in many respects to Fig. 2, but in which the ducts are slightly shortened and brought within the shaft extension of the rollers, so that it is unnecessary to extend the shafts through the flues 58, 62 and thereby save considerable packing of the shafts etc.

The operation may be described as follows:—The material is supplied continuously to the upper compartment 6 of the casing by the feeding conveyer 32, and fans 52, 66 being in operation, dehydrated air is supplied to chamber 54, flue 58 and the compartments 6 of the casing, whereas fan 66 creates or establishes a partial vacuum in chamber 64 and flue 62, so as to exhaust the moisture laden air rapidly from the material treating compartments. The material is carried lengthwise of the compartments 6 by the conveyers, said material being discharged from one conveyer on to the other conveyer successively, and the material being brushed from the delivery end of each conveyer. As the material is carried through the successive compartments it is subjected to the treatment of a continuous flow of dehydrated air which is supplied simultaneously to all the compartments. The air flows through inlets 59 uniformly into all the compartments and the inflowing air circulates downwardly through the upper runs of the conveyers, the air taking up moisture from the material under treatment, and the moisture laden air flowing out of the compartments through exits 67 and into the suction flue 62 from whence it is removed rapidly by the suction fan 66.

Changes in the details of construction, and in the form, size and proportion of parts may be made by a skilled constructor without departing from the spirit or sacrificing any of the advantages of this invention as defined in the claims.

Having thus fully described the invention, what we claim as new, and desire to secure by Letters Patent is:—

1. In a dehydrating apparatus, the combination of a series of compartments, means for supporting therein a material to be treated, a flue for supplying dehydrated air to said compartments, a downwardly tapering outlet flue connected with said compartments individually and extending downwardly therefrom, and means for circulating air through the flues and compartments.

2. In a dehydrating apparatus, the combination of a series of compartments, means for supporting therein a material to be treated, an upwardly tapering flue in communication with said compartments for supplying dehydrated air uniformly thereto, a downwardly tapering outlet flue having separate connection with the individual compartments and extending downwardly therefrom, whereby moisture-laden air from the compartments will be free to descend within said outlet flue, and means for exhausting such air from said outlet flue.

3. In a dehydrating apparatus, a chamber provided with a plurality of compartments, a plurality of traveling conveyers each positioned within one of said compartments, automatic dampers positioned at the ends of the compartments for substantially precluding the passage of air from one compartment into the next compartment, means for supplying dehydrated air to the chamber, and means for distributing the air supplied uniformly to the several compartments.

4. In a dehydrating apparatus, a chamber provided with a plurality of compartments, a plurality of traveling conveyers each positioned within one of said compartments, brushing devices in coöperative relation to the delivery end of the conveyer, dampers for substantially precluding the escape of air from one compartment into the next compartment, and means for supplying dehydrated air to, and distributing the same uniformly through, the several compartments.

5. In a dehydrating apparatus, a chamber provided with a plurality of compartments, a plurality of traveling conveyers each positioned within one of said compartments, brushing devices in coöperative relation to the delivery end of one conveyer and the loading end of the next conveyer, dampers positioned within the compartments and in operative relation to the brushing devices for substantially precluding the escape of air from one compartment to another, and means for supplying dehydrated air to the compartments of said chamber.

6. In a dehydrating apparatus, the combination of a series of compartments, means for supporting therein a material to be treated, an upwardly tapering flue having communication with said compartments by inlets positioned above said material-supporting means, means for supplying dehydrated air to said flue, and thence through said inlets at points above the material supporting means, the interior of said flue being unobstructed whereby air is supplied uniformly to said series of compartments, a downwardly tapering outlet flue in communication with said compartments by outlets positioned below the material supporting means, whereby air supplied to the compartments flows downwardly through the material and emerges from said compartments by said outlets, and means for exhausting air from said outlet flue.

7. In a dehydrating apparatus, the combination of a series of material supporting conveyers, air inlets positioned to supply air at points above said conveyers, air exits positioned in such relation to the air inlets and the conveyers as to afford outlets for air below said conveyers, an air supply flue for supplying dehydrated air through said inlets, an outlet flue into which air flows through said exits, said air supply flue and the outlet flue tapering in opposite directions with respect to each other, and means for circulating air through the flues and the material upon said conveyers.

8. In a dehydrating apparatus, a chamber provided with a series of compartments each having an air inlet and an air exit, the latter being below the plane of said inlet, a traveling conveyer positioned within each compartment so that the inlet will be above, and the exit will be below, said conveyer, an upwardly tapering flue for supplying air to said compartments, and a downwardly tapering flue for carrying moisture laden air from said compartments.

9. In a dehydrating apparatus, a chamber provided with a series of compartments each having an air inlet and an air exit, a traveling conveyer positioned within each compartment, an upwardly tapering flue communicating with said air inlets to the compartments, means for supplying dehydrated air to said flue, a downwardly tapering flue communicating with the air exits from said compartments and means for exhausting moisture laden air from the compartments and the last named flue.

10. In a dehydrating apparatus, a series of material treating chambers, means for moving the material to be treated through said chambers, an upwardly tapering air supply flue, a tapering down draft outlet flue, air inlets to said chambers, air outlets from said chambers, said air inlets and air outlets being relatively positioned to secure the downward circulation of air through the material under treatment, means for blowing air through said supply flue, and means for exhausting air from said outlet flue.

11. In a dehydrating apparatus, a series of material treating chambers, endless conveyers for moving the material to be treated through said chambers, an upwardly tapering air supply flue, air inlets to said chambers, a downwardly tapering down draft outlet flue, air outlets from said chambers, said air inlets and air outlets being positioned respectively above and below said conveyers to secure a downward circulation of air through the material carried by said conveyers, means for blowing air through the supply flue, and an exhauster connected with the outlet flue for drawing off moisture-laden air therefrom.

12. In a dehydrating apparatus, a series of connected material treating chambers, a series of endless conveyers for moving the material to be treated through said chambers and successively from one chamber to the next below it, means for supplying dehydrated air to said chambers, and automatic dampers positioned substantially at the end portions of said conveyers for substantially precluding the flow of air from one chamber to the other.

13. In a dehydrating apparatus, the combination of a series of compartments, means for supporting therein the material to be treated, an upwardly tapering supply flue connected by air inlets separately with said compartments, a downwardly tapering outlet flue connected by air outlets separately with the individual compartments, said air inlets and air outlets being positioned respectively above and below the material supporting means, and means for feeding dehydrated air through the supply flue to the compartments, whereby the air circulated into contact with the material flows through the air outlets from said compartments directly into the outlet flue.

In testimony whereof we have signed our names to this specification in the presence of two subscribing witnesses.

GORDON DON HARRIS.
JAMES S. POLLARD.

Witnesses:
J. F. MOTHERSHEAD,
M. E. FREEMAN.